_United States Patent Office_ 3,073,809
Patented Jan. 15, 1963

3,073,809
PROCESS FOR PRODUCING ETHYLENE-1-OLEFIN COPOLYMERS
Rudolph W. Kluiber, Newark, and Wayne L. Carrick, Essex Fells, N.J., assignors to Union Carbide Corporation, a corporation of New York
No Drawing. Filed July 31, 1958, Ser. No. 752,176
11 Claims. (Cl. 260—88.2)

This invention relates to a catalytic polymerization of ethylene and 1-olefins to yield improved solid copolymers of ethylene and 1-olefins.

More particularly, the invention is concerned with the employment of a hydrocarbon soluble metallo-organic catalyst composition highly effective in promoting rapid polymerization of mixtures of ethylene and 1-olefins having up to about eight carbon atoms at relatively low reaction temperatures and pressures, to produce copolymers having superior environmental crack resistance and freedom from skinning when injection molded.

Furthermore, the invention includes the production of normally solid copolymers of ethylene and 1-olefins particularly characterized by a relatively narrow molecular weight distribution, which are relatively high in molecular weight and contain up to about 30 percent by weight of 1-olefin. The ethylene-1-olefin copolymers herein described, and in particular the ethylene-propylene copolymers contain only very minor concentrations of waxy low-molecular weight polymeric components, and in this respect are considerably different from the copolymers produced by methods heretofore known.

Numerous procedures have been proposed to polymerize olefins to normally solid polymers. Of these, the oldest and most successful has been the high-pressure, high temperature polymerization technique first described in 1937 in British Patent 471,590 by Fawcett et al. Ethylene polymers prepared by this procedure have been reported as having a density at 23°/23° C. of 0.91–0.92 and a melting temperature of 105° C.–115° C. The process is, however, not applicable to produce ethylene-1-olefin copolymers since the 1-olefins act as chain terminators for the polymerization and do not copolymerize.

Newer polymerization procedures not dependent upon the use of high pressures or temperatures have enabled the production of normally solid ethylene homopolymers of considerably higher density being between about 0.94 and 0.96 and of much higher melting temperatures, e.g. of about 125° C.–135° C. and of ethylene-1-olefin copolymers. These newer processes employ various metal compounds as ethylene polymerization catalysts. One of the new catalyst systems is based on the use of aluminum trialkyls promoted with a reducible compound of a metal of the IV–B, V–B, or VI–B groups of the periodic system of elements. This system is conventionally known as the Ziegler process and the catalyst mixture commonly called the Ziegler catalyst. In this process the catalyst system is insoluble in the reaction media, which presents difficulty in separation of the catalyst residue from the polymer.

Presently available information on ethylene-1-olefin copolymers, and particularly the ethylene-propylene copolymers produced by the Ziegler process, shows these polymers to be considerably inferior to most polyethylenes and polypropylenes because of a high concentration of low molecular weight polymeric oils and greases. For practical purposes in making films and molded articles, these available copolymers have many shortcomings so as to be of little commercial value.

It is therefore an object of the present invention to produce a useful copolymer of ethylene and 1-olefins which overcomes the shortcomings of the copolymers heretofore known, and particularly, which will be relatively free of low molecular weight polymeric oils and the like. It is a further object of the present invention to provide a process for the rapid copolymerization of ethylene and 1-olefins in a hydrocarbon soluble catalyst system to give improved yields of the improved copolymers. Further objects will be readily seen from the following description.

According to the present invention it has now been found that copolymers of ethylene and 1-olefins containing up to about eight carbon atoms, can be obtained by polymerizing ethylene and the 1-olefin in monomeric form in contact with a dispersion or a solution in an inert hydrocarbon solvent of a catalyst composition comprising essentially three components, one component being a hydrocarbon soluble aluminum trihalide, the second component being an organometallic compound or a halogen substituted organo-metallic compound in which the halogen is directly attached to the metal, of a metal selected from the groups II–B, IV–A and V–A of the periodic chart of the elements of the text "General Chemistry," by Deming (5th ed.), John Wiley & Sons, publishers, and a third component which should be present in only minute amounts based on the weight of the first two components being a hydrocarbon soluble compound of vanadium, or a vanadium compound which can become hydrocarbon soluble by reaction with the other catalyst components.

Aluminum trihalides found particularly effective as the first components are aluminum tribromide and aluminum trichloride. Aluminum trifluoride, due to its insolubility generally in hydrocarbons is ineffective. The use of aluminum triiodide as one of the catalyst components is attended by very low yields of polyethylene. It has further been found that the aluminum trihalides are unique in these catalyst compositions and cannot be satisfactorily replaced by other Lewis acids.

The organo-metallic compounds of the second component are exemplified by the organo compounds of the following metals, namely, those of group II–B such as zinc, cadmium and mercury, the metals of group IV–A such as germanium, tin and lead, and the group V–A metals such as antimony and bismuth.

The hydrocarbon portion of these metallo-organic compounds are preferably alkyl or aryl groups, in particular phenyl groups which generally promote higher polymer yields.

Typical representative metallo-organic compounds useful as the second member of the catalyst composition are as follows: the listing, however, is to be regarded in exemplification and not restriction of the useful compounds: Di-n-butyl zinc, dimethyl zinc, di-o-tolylzinc, dibutyl cadmium, diisoamyl cadmium, diphenylmercury, dibenzylmercury, diisoamylmercury, di-n-hexylmercury, ditolylmercury, amyltriphenylgermanium, benzyltriphenylgermanium, butyltriphenylgermanium, hexabenzyldigermane, hexaphenyldigermane, tetra-1-amylgermanium, dibenzyldiethylstannane, diethydiisobutyltin, diethyldiphenyltin, dimethyldiethyltin, triphenyl tin bromide, triphenylbismuthine, triphenyl tin chloride, hexaethylditin, hexaphenylditin, phenyltribenzyltin, tetra-n-ethylditin, tetraacyclohexyltin, tetraphenyltin, tribenzylamyltin, tetraethyllead, tetra-n-propyllead, triethylantiethyltin, tetraethyllead, tetra-n-propyllead, triethylantimony, triphenylstibine, triethylbismuthine, and like compounds.

The preferred metallo-organic compounds as determined by high yields of ethylene-1-olefin copolymers per unit weight of catalyst composition are those of tin, mercury, and dismuth. Of these, the highest catalyst efficiency, have generally been obtained by the metallo-organic compounds of tin having the formula $SnR_nX_m$ wherein R is aryl, X is chloride or bromine, $n$ is either 3 or 4, $m$ is either zero or one, and $n+m$ equals 4.

The third catalyst component, namely a compound of vanadium is preferably one soluble in an inert hydrocarbon liquid, as for example, benzene, cyclohexane, decane, isooctane, methyl cyclohexane, butane, propane, or heptane, or alternatively, a compound which can form a hydrocarbon soluble compound by interaction with the trihalide; moderate heating up to the refluxing temperature of the hydrocarbon liquid can be used to accelerate this interaction.

Suitable hydrocarbon soluble vanadium compounds are vanadium oxytrichloride, vanadium tetrachloride, and vanadium pentafluoride.

Compounds of vanadium which form hydrocarbon soluble products on interaction with an aluminum halide by heating the two components together in the presence or absence of the hydrocarbon are exemplified by vanadium dichloride, vanadium dibromide, di-cyclopentadienyl-vanadium dichloride, vanadium pentoxide, and vanadium oxydichloride.

Although vanadium is a transition element, other transition elements surprisingly cannot be substituted for it in this invention. The use of such metal salts as titanium tetrachloride and zirconium tetrachloride when substituted for the vanadium compound under all other essential conditions of this invention yields no polymer.

A characteristic shared by all the compounds used as the first two components (aluminum halide and organo-metallic compounds) of the catalyst composition is that when used together, and in the absence of the vanadium compound, they do not promote the polymerization of ethylene and propylene or other 1-olefins to a normally solid copolymer.

However, most surprisingly, the presence in the catalyst composition of mere traces of the third component, namely a hydrocarbon soluble compound of vanadium, activates the entire catalyst composition whereby ethylene and these 1-olefins, particularly the lower 1-olefins as propylene, butene-1, pentene-1, etc., when contacted with this catalyst composition are rapidly polymerized to tough, impact-resistant ethylene-1-olefin copolymers.

The unique activation or triggering action exhibited by only minute amounts of the hydrocarbon soluble vanadium compound in combination with the other two components of the catalyst does not extend to combinations of it and only one of the other components; all three components are critically necessary. However, only minute amounts of the vanadium compounds are necessary; generally molar concentrations of from 0.0005 to 0.05 mole per mole of aluminum halide is highly desirable to secure the very narrow molecular weight distribution of the copolymers. Amounts greater than about 0.05 mole per mole of aluminum halide tend to broaden out the molecular weight distribution of the polymer. Concentrations of the vanadium compound of less than 0.0005 mole per mole of aluminum halide can be used in this system but the catalyst becomes much more susceptible to poisons.

The minute amount of the hydrocarbon soluble vanadium compound need not be added as a separate entity to form the effective catalyst composition since such vanadium compounds have been found present in effective amounts as a normal impurity in technical grades of aluminum halides and in most all commercial "chemically pure" grades of aluminum halides thus far examined. This is apparently because no attempts are made to eliminate completely the vanadium compounds from the raw materials employed to produce the aluminum halides.

Unlike the other known catalyst systems employed to prepare ethylene homopolymers and copolymers, these catalyst components described herein are soluble in the hydrocarbon diluent and catalytically active solutions of catalyst and diluent can be filtered through bacterial filters (pore size 1–2 microns) with little or no diminution of catalytic activity and show no Tyndal beam effect. This is a positive indication that a true solution is secured, which in effect probably accounts for the much faster rate of polymerization and improved yields secured by the catalysts herein employed, and perhaps to a lesser extent, affects the molecular weight and the narrow molecular weight distribution of the copolymers produced.

The proportion of aluminum trihalide to organo-metallic compound in the catalyst composition is not narrowly critical. For example, the molar ratio of aluminum halide:organo-metallic compound has been varied from about 1:10 to 10:1. Economic reasons usually prescribe an aluminum halide:organo-metallic compound molar ratio between 5:1 and 1:1, with best results being secured employing about 2.7 moles aluminum halide per mole of tetraphenyl tin.

Anhydrous aluminum halides and vanadium halides in general are hygroscopic; therefore, special care should be taken to exclude water. Exposure of these two particular catalyst components to air or oxygen should also be avoided since this can seriously reduce polymer yield. After the catalyst components have been mixed, continuous exposure of the catalyst to air can be detrimental but a small amount of oxygen in the system can be beneficial.

The polymerization described herein can be conducted in the presence of an inert diluent serving as a solvent for the catalyst mixture and for the monomers undergoing polymerization. The solvent should be a liquid at the reaction temperature and pressure employed and can be a saturated aliphatic, saturated cycloaliphatic or aromatic hydrocarbon or inert halogenated derivatives thereof. While serving as a solvent for the ethylene and 1-olefin monomers, the solvent need not necessarily function as such for the copolymer. The amount of diluent present to obtain a polymerization is not critical. Total catalyst to diluent ratios are also not critical; thus, ratios of one millimole per 500 grams of diluent are thoroughly operative. The diluent should be purified to remove reactive impurities such as acetylenes and compounds containing highly polar substituents (i.e. nitriles and the like), oxygen, sulfur, active hydrogen compounds (i.e. alcohols, water, amines), or non-terminal olefinic unsaturation (i.e. cyclohexene, butene-2), which might react with the catalyst and consequently inactivate it. Particularly suitable hydrocarbons serving as the liquid reaction media are, for example, methylcyclohexane, cyclohexane, hexane, heptane, isooctane, pentane, and highly purified kerosene, and like saturated hydrocarbons, as well as other inert solvents such as benzene, toluene, chlorobenzene, bromobenzene and the like.

The polymerization of ethylene and 1-olefins using the catalyst composition herein described can be readily conducted by feeding the monomers, either in admixture or separately but substantially free from acetylene, ketone, water, and other of those contaminants indicated above as being reactive with the catalyst, to a dispersion or solution of the catalyst composition in a suitable inert hydrocarbon solvent maintained at a temperature from about 40° C. to 100° C. and at pressures from subatmospheric to about 50 p.s.i.g. Inert gases, such as nitrogen or argon, can be used in admixture with the monomers to yield monomer partial pressures of less than one atmosphere. One method of reducing the average molecular weight of the copolymer consists in using monomer partial pressures less than one atmosphere. Higher pressures may be used if desired, but are ordinarily not required to obtain good yields of polymer.

Depending somewhat on the particular 1-olefin employed, the amount of the 1-olefin in the copolymer and the reaction temperature, the polymer will form either as a true solution or precipitate in irregular size particles which can be filtered off. The solubility of the copolymer increases with increasing temperatures and with increasing 1-olefin content. For the soluble copolymers, coagulation and/or precipitation can be effected by the addition of a suitable polar liquid, preferably isopropanol and the like liquids, to the reaction mass. The precipitated polymer particles after removal of the diluents can be washed with polar liquids to remove the catalyst residues and dried in conventional manner.

Suitable for use in the process of this invention are 1-olefins containing up to about eight carbon atoms. While both straight and branched chain 1-olefins can be employed, branching should be no closer to the double bond than the number three carbon atom. There appears to be some steric hindrance to the copolymerization when employing branched chain olefins having branches on the number two carbon atom, such as with isobutylene. We particularly prefer those 1-olefins having no branching closer to the double bond than the number four carbon atom. Of all 1-olefins, we more particularly prefer propylene as the co-reactant with ethylene, thereby securing a copolymer of highly desirable properties from the most inexpensive materials. For some reason not fully understood, the 1-olefin monomers having greater than eight carbon atoms will copolymerize only with great difficulty and sometimes will not polymerize at all. For such reasons they are not considered as part of this invention.

Copolymers prepared by this invention can be made containing as much as thirty percent by weight of the 1-olefin depending primarily upon the concentration of 1-olefin in the monomer mixture. Surprisingly, this catalyst mixture is not effective for promoting the polymerization of pure 1-olefins to secure a normally solid polymer. Using propylene as an example, the catalyst is effective in making copolymers containing up to about thirty percent by weight propylene when the propylene to ethylene molar ratio is about 3:2. At higher concentrations of ethylene in the monomeric mixture, copolymers can vary all the way down to 1% or less of propylene. Inasmuch as propylene and other 1-olefins incorporate in the copolymer at a much slower rate than does the ethylene, it is generally necessary to have a higher molar concentration of 1-olefin in the monomer mixture than is desired in the copolymer. For example, when a copolymer containing 8 percent by weight of propylene is desired, an amount of propylene in the monomers mixture of about 18 percent can be employed for 11 percent propylene in the polymer, about 23 percent in the monomer mixture can be used and for 16 percent propylene in the polymer, we prefer to have about 40 percent by weight propylene in the monomer mixture. With other 1-olefins, the rate of incorporation into the copolymer is somewhat slower than with propylene but the solubility of the monomer in the solvent is increased, thereby counteracting this effect to some degree.

The melt index of the polymers produced herein varies as the 1-olefin content, the higher the 1-olefin content, the higher the melt index. For best results in yields, those polymers containing about 1 to 10 percent by weight of 1-olefin are preferred. Ethylene-propylene copolymers in this range, for example, will generally have a melt index measured at 190° C. using 44.0 p.s.i. on the piston, according to ASTM Specification 1238–52T of less than 1.0 and quite often the melt index will be less than 0.03. With more than 10 percent propylene in the copolymer, melt indices of as high as 10 or more can be secured in the polymers. Comparable melt indices can be achieved with the other ethylene-1-olefin copolymers. The melt index can be increased by increasing the amount of 1-olefin in the polymer and by varying other factors in the reaction. The melt index of the copolymers can, for example, also be increased if desired, by increasing the reaction temperature and by reducing the partial pressures of the monomers, particularly by dropping the partial pressure to below about one atmosphere.

The copolymers of this invention are characterized by having improved stress crack resistance and relative freedom from skinning during injection molding and particularly when compared with copolymers of comparable melt index prepared by other catalyst systems. Impact resistance of these copolymers is high, and films prepared therefrom have excellent clarity and thin film drawdown. Particularly good in these respects are the ethylene-propylene copolymers.

Furthermore, our copolymers are characteristically different from those prepared by the conventional Ziegler catalysts in having a narrow molecular weight distribution and a minor amount of low molecular weight components, as hereinafter shown.

For purposes of comparison of the copolymers prepared by the process of this invention, copolymers were prepared by the use of conventional Ziegler catalysts and with a catalyst composition comprising a reducible oxide of a metal of group VI of the periodic chart in association with an active or promoting catalyst support being known in the trade as Marlex catalyst system of the Phillips Petroleum Co., and as more fully described in Belgian Patent No. 530,617.

EXPERIMENT A

The copolymers prepared by the Ziegler technique for purposes of comparison were prepared as follows: 15 m. moles of Al(i.Bu)$_3$ and 5 m. moles of TiCl$_4$ were added into a flask containing 1 liter of dry cyclohexane under a nitrogen atmosphere. A mixture of ethylene and propylene gas, containing 10 percent by weight propylene was slowly bubbled through the catalyst mixture with stirring, atmospheric pressure being maintained in the reaction. The temperature was maintained at about 50° C. After four hours, the reaction was quenched with isopropanol to precipate the polymer, yielding 12 grams of copolymer containing about 8 percent by weight of propylene. The copolymer had a melt index of 0.5 and an extractable oil content of 10 percent by weight of total copolymer, as determined by ASTM Test 1238–52T, and by extended extraction in boiling xylene, respectively.

The following examples are illustrative of this invention:

EXAMPLE 1

To a three liter flask fitted with an agitator, gas inlet tube, thermometer and reflux condenser was charged two liters of cyclohexane and 1 g. of tetraphenyl tin. A monomer mixture containing by weight about 97% ethylene and 3% propylene was bubbled in at a rate of about 3 liters/min. with agitation. The reaction mixture was heated to boiling to remove traces of moisture and then cooled to 60° C. while maintaining the gas flow. Thereafter, 170 ml. of a cyclohexane solution of aluminum chloride (4 g. of aluminum chloride/liter) and about 1–2 mg. vanadium tetrachloride in cyclohexane solution (5 mg. VCl$_4$/cc.) was added. Polymerization started immediately and the temperature rose to about 65–70° C. The reaction mixture at 70° C. was homogeneous, both catalyst and copolymer being in solution. Gas flow of ethylene-propylene mixture was maintained for about 3 hours. At this point the temperature had dropped to about 40° C. and no further gas absorption was noted. About 0.8 liter of isopropyl alcohol was added to the reaction mixture and the precipitated copolymer was filtered off, washed successively with isopropyl alcohol, methanol and finally with acetone. The tough, opaque white product was air dried at room temperature. The yield varied in several runs from about 40–60 g. By infra-red analysis, the product contained 3% propylene by weight.

EXAMPLE 2

A copolymer of ethylene and propylene was prepared after the manner described in Example 1, except that the monomer mixture contained about 6% propylene by weight. The resulting copolymer by infra-red analysis contained 5% propylene by weight.

EXAMPLE 3

A copolymer was prepared after the manner described in Example 1 with a monomer mixture containing about 10% propylene by weight. The resulting copolymer by infra-red analysis contained 6.5% propylene by weight.

EXAMPLE 4

A copolymer was prepared after the manner described in Example 1, but using a monomer mixture containing about 15% propylene. The resulting copolymer contained, by infra-red analysis, about 9.7% by weight of propylene.

The properties of the copolymers obtained in the above examples are tabulated in Table I.

TABLE I

| Method | Ex. 1 | Ex. 2 | Ex. 3 | Ex. 4 |
| --- | --- | --- | --- | --- |
| Percent Propylene | a 3 | a 6 | a 8.5 | a 9.7 |
| Density | .924 | .921 | .917 | .915 |
| Melt Index | b .001 | b .008 | b .012 | b .027 |
| Tensile Strength (p.s.i.) | 3,180 | 2,910 | 2,900 | 2,530 |
| Elongation, Percent | 578 | 772 | 736 | 738 |
| Yield Strength (p.s.i.) | 1,960 | 1,660 | 1,500 | 1,360 |
| Brittle Temperature, degrees | | | −105 | −105 |
| Xylene Extractibles, percent wt | 0.22 | 0.1 | 0 | 0 |
| Coacervation, percent Lows c | 0.44 | 0.72 | 0.36 | 0.44 |
| Molecular Weight | 460,000 | 400,000 | 265,000 | 290,000 |
| Secant Modulus (p.s.i.) | 38,100 | 38,800 | 25,200 | 20,900 |
| Tensile Impact (ft. lbs./cu. in.) | | 644 | 645 | 590 | a Determined by X-ray calibrated by Infra-red.
b Calculated from 440 p.s.i. melt index by dividing it by 100.
c About a one-sixth aliquot portion of the soluble lows.

As is evident from the high yield strength, the low amount of xylene extractibles and the percent low molecular weight polymers as determined by the coacervation studies, these copolymers are vastly improved over those heretofore known and overcome many of the defects of the Ziegler and Marlex process copolymers.

The physical properties of the copolymers prepared by the Ziegler and Marlex systems is tabulated in Table II following, for purposes of comparison.

TABLE II

| Method | Ziegler Copolymers | | | | Marlex Copolymers |
| --- | --- | --- | --- | --- | --- |
| Percent Propylene in Polymer | a 7.1 | a 4.5 | a 9.0 | a 10.2 | 8 |
| Density | .930 | .933 | .921 | .903 | .930 |
| Melt Index | .35 | 2.9 | 0.8 | 0.6 | .40 |
| Tensile Strength (p.s.i.) | 1,760 | 2,220 | 1,190 | (c) | 1,800 |
| Elongation, percent | 121 | 45 | 430 | (c) | 131 |
| Yield Strength (p.s.i.) | 1,650 | 2,150 | 1,110 | 540 | 1,680 |
| Xylene Extractibles, percent wt | 13.77 | 14.38 | | | 12.8 |
| Coacervation, percent lows b | 7.70 | 8.12 | | | 3.8 |
| Molecular Weight | 230,000 | 176,000 | | | 240,000 |
| Secant Modulus (p.s.i.) | | | 30,200 | 9,620 | 46,200 |
| Tensile Impact (ft. lbs./cu. in.) | 75 | 47 | | | | a Determined by infra-red.
b About a one-sixth aliquot portion of the soluble lows.
c Did not break at 1000 percent elong.

A typical molecular weight distribution of polymer molecules in the copolymers of the present invention is illustrated in Table III by fractionation data of the copolymer prepared according to Example 1, having a propylene content of 3 percent and a melt index of 0.001. Fractionation of the copolymers was carried out by the coacervation technique whereby fractions of the copolymer were precipitated from an ethyl benzene solution of the polymer at 125° C. by the incremental addition of amyl alcohol. The copolymers were prepared as hereinbefore described.

TABLE III

| Reduced viscosity of fraction | Weight percent of copolymer of this invention (MI-0.001) | Weight percent of Ziegler Copolymer M.I.-0.35 |
| --- | --- | --- |
| .4 | 2 | 30 |
| .8 | 3 | 20 |
| 1.2 | 6 | 9 |
| 1.6 | 8 | 8 |
| 2.0 | 13 | 5 |
| 2.4 | 16 | 4 |
| 2.8 | 49 | 3 |
| 3.2 | 3 | 2 |
| 3.6 | 0 | 2 |
| 4.0 | 0 | 2 |
| 4.4 | 0 | 2 |
| 4.8 | 0 | 2 |
| 5.2 | 0 | 1 |
| 5.6 and above | 0 | 7 |

EXAMPLE 5

Ethylene-Butene Copolymers

In a 3 necked 3 l. flask fitted with a stirrer gas inlet tube and a condenser were added 1 g. of $\phi_4Sn$ and 2 l. of cyclohexane, the solution was brought to boil and about 100 ml. were allowed to distill out. A stream of ethylene containing about 7% by weight butene-1 was then introduced and the solution allowed to cool to 60°. Aluminum chloride (about 1 g.) was introduced as its saturated solution in boiling cyclohexane (about 170 ml.) and 10 mg. of $VCl_4$ were added. Polymerization proceeded for about ½ hour. The slightly viscous solution was quenched with 700 ml. iso-propanol and yielded 37 g. of ethylene-butene-1 copolymer containing 8% by weight of butene-1 residues having a melt index at 190° C. of 0.74, and a room temperature tensile modulus of 32,000 p.s.i.

In another experiment using about 15% weight butene-1 in the gas feed but only ½ the $AlCl_3$, there were obtained 5 g. of polymer containing about 19% butene-1 residues and having a melt index at 190° C. of 550. This material was only somewhat crystalline.

EXAMPLE 6

High Propylene Content Copolymers

In a 3 l. flask fitted with a condenser, gas inlet tube thermometer and chain stirrer were added 2 liters of cyclohexane (99+ percent) and 1 g. of tetraphenyl tin. The solution was heated to boiling and about 100 ml. of solvent distilled to remove traces of water.

A gas stream containing 60% (weight) propylene and 40% ethylene was started and the mixture allowed to cool with stirring to 65°. The rest of the catalyst, 170 ml. of a boiling cyclohexane solution saturated with aluminum trichloride and 5 mg. vanadium tetrachloride were then added. The polymerization was not noticeably exothermic and after about 30 min. the reaction was quenched with 300 ml. isopropanol and 700 ml. of methanol. The copolymer came out of solution as a viscous oil and was washed 2 times with isopropanol and once with methanol. After drying in a vacuum oven at 70% overnight, 20 g. of a clear amorphous polymer were obtained, having a melt index at 190° C. of 225 and a molecular weight based on iodine number (1 double bond per molecule) of 3500. This material was similar to a stiff taffy.

EXAMPLE 7

Ethylene Pentene-1 Copolymers

In a 3 l. flask fitted with a condenser, gas inlet tube thermometer and chain stirrer were added 2 l. cyclohexane and 1 g. tetraphenyl tin. The solution was heated to boiling and 100 ml. of solvent distilled to remove traces of water. Ethylene flow was started and the reaction mixture allowed to cool to 60°. A boiling saturated cyclohexane solution of aluminum trichloride (170 ml. containing 1 g. $AlCl_3$) and 5 mg. vanadium tetrachloride were added, followed by 10 ml. of pentene-1. The reaction was slightly exothermic and after ½ hour the clear reaction mixture was quenched with 300 ml. isopropanol and 300 ml. methanol, and the precipitated polymer worked up in the usual manner. The product amounted to 21 grams and had a melt index at 190° C. of 17 and a room temperature tensile modulus of 52,000 p.s.i. and contained about 7% by weight pentene-1. Other runs made adding the pentene-1 before the aluminum trichloride or with the ethylene gave up to 40 g. of polymer.

EXAMPLE 8

Ethylene Hexene-1 Copolymers

In a manner identical with that for pentene-1 ethylene copolymers in Example 7, there were obtained by using hexene-1 for pentene-1 24 to 35 g. of polymer having a melt index at 190° C. of 24, containing about 11% hexene-1 and having a room temperature tensile modulus of 50,000 p.s.i.

EXAMPLE 9

Ethylene-Heptene-1 Copolymers

In a manner similar to that of Example 7 using heptene-1 instead of pentene-1, there were obtained copolymers containing between 1% and 6% of heptene-1 residues. These copolymers had a melt index at 190° C. of about 3, and were about 65% soluble in boiling cyclohexane.

EXAMPLE 10

Ethylene-4-Methyl Pentene-1 Copolymers

In a manner similar to that of Example 7, using ethylene and 4-methyl pentene-1 instead of pentene-1, there was obtained a copolymer containing about 10% by weight of 4-methylpentene-1 residues having a melt index at 190° C. of 10 and a room temperature tensile modulus of 70,000 p.s.i.

What is claimed is:

1. A process for producing normally solid copolymers of ethylene and a 1-olefin which includes the step of contacting a mixture of ethylene and a 1-olefin monomer containing up to about eight carbon atoms under polymerizing conditions with a hydrocarbon soluble catalyst composition comprising as one component a hydrocarbon soluble aluminum trihalide, as a second component an organo-metallic compound of a metal selected from groups II-B, IV-A and V-A of the periodic system of elements present in an amount from about 0.1 to 10 moles per mole of aluminum halide and as a third component at least a trace amount of a vanadium compound but said amount being less than about 0.05 mole of vanadium per mole of said aluminum halide.

2. A process according to claim 1 wherein the catalyst composition is at least in part dissolved in an inert hydrocarbon liquid.

3. A process according to claim 2 wherein the organo-metallic compound is a compound of tin having the formula $SnR_nX_m$ wherein R is an aryl group, $n$ is an integer from 3 to 4 inclusive, X is a member of the group of chlorine and bromine and $m$ equals $4-n$.

4. A process according to claim 2 wherein the 1-olefin is propylene.

5. A process for producing high molecular weight normally solid copolymers of ethylene and 1-olefins which comprises the step of contacting a mixture of ethylene and a 1-olefin monomer containing up to about eight carbon atoms in the presence of a catalyst composition dissolved in an inert hydrocarbon liquid comprising as one component, a hydrocarbon soluble aluminum trihalide, as a second component an organo-metallic compound of a metal selected from group II-B, IV-A and V-A of periodic system of elements present in an amount from about 0.1 to 10 moles per mole of aluminum halide and as a third component, between 0.0005 and 0.05 mole of a vanadium compound selected from the group consisting of hydrocarbon soluble vanadium compounds and vanadium compounds forming hydrocarbon soluble compounds by interaction with the aluminum trihalide per mole of the said hydrocarbon soluble aluminum trihalide, at a temperature between about 40° C. to about 100° C.

6. A process according to claim 5 wherein the organo-metallic compound is a compound of tin having the formula $SnR_nX_m$ wherein R is an aryl group, $n$ is an integer from 3 to 4 inclusive, X is a member of the group of chlorine and bromine and $m$ equals $4-n$.

7. A process according to claim 5 wherein the organo-metallic compound is tetraphenyl tin and the vanadium compound is vanadium tetrachloride.

8. A process according to claim 7 wherein the 1-olefin is propylene.

9. A process for producing a copolymer of ethylene and 1-olefins containing up to about 30 percent by weight of the 1-olefin polymerized therein, which includes the steps of heating and reacting a mixture of ethylene monomer and a 1-olefin monomer containing up to about eight carbon atoms, in the presence of a catalyst composition at least in part dissolved in an inert hydrocarbon liquid, at a temperature between about 40° C. to about 100° C. for a time sufficient to cause copolymerization of said ethylene and 1-olefin, and recovering the polymer thus produced, said catalyst composition comprising a hydrocarbon soluble aluminum trihalide, an organo-metallic compound of a metal selected from groups II-B, IV-A and V-A of the periodic system of elements, and a hydrocarbon soluble compound of vanadium in an amount of between 0.0005 and 0.05 mole per mole of said aluminum trihalide, and the molar ratio of aluminum trihalide to organo-metallic compound being between 1:10 to 10:1.

10. A process according to claim 9 wherein the organo-metallic compound is tetraphenyl tin and the vanadium compound is vanadium tetrachloride.

11. A process according to claim 10 wherein the 1-olefin is propylene.

References Cited in the file of this patent

UNITED STATES PATENTS

| | | |
|---|---|---|
| 2,825,721 | Hogan et al. | Mar. 8, 1958 |
| 2,846,427 | Findlay | Aug. 5, 1958 |
| 2,900,374 | Aries | Aug. 18, 1959 |

FOREIGN PATENTS

| | | |
|---|---|---|
| 543,941 | Belgium | Mar. 24, 1956 |
| 785,314 | Great Britain | Oct. 23, 1957 |